(12) United States Patent
Carricarte et al.

(10) Patent No.: US 8,671,155 B2
(45) Date of Patent: Mar. 11, 2014

(54) SYSTEM AND METHOD OF EMPLOYING A CLIENT SIDE DEVICE TO ACCESS LOCAL AND REMOTE DATA DURING COMMUNICATION DISTRUPTIONS

(75) Inventors: Andrew L. Carricarte, Miami, FL (US); Jose M. Sanchez, Miami Springs, FL (US)

(73) Assignee: IOS Health Systems, Inc., Miami, FL (US)

( * ) Notice: Subject to any disclaimer, the term of this patent is extended or adjusted under 35 U.S.C. 154(b) by 125 days.

(21) Appl. No.: 12/581,533

(22) Filed: Oct. 19, 2009

(65) Prior Publication Data

US 2011/0093519 A1    Apr. 21, 2011

(51) Int. Cl.
*G06F 15/16* (2006.01)
(52) U.S. Cl.
USPC ........... 709/217; 709/218; 709/219; 709/220; 709/221
(58) Field of Classification Search
USPC .................................................. 709/217–220
See application file for complete search history.

(56) References Cited

U.S. PATENT DOCUMENTS

| | | | | |
|---|---|---|---|---|
| 5,390,238 A | * | 2/1995 | Kirk et al. ................ | 379/106.02 |
| 7,007,003 B1 | * | 2/2006 | Rybicki ........................ | 707/613 |
| 7,032,022 B1 | * | 4/2006 | Shanumgam et al. ........ | 709/225 |
| 2002/0059400 A1 | * | 5/2002 | Ikami et al. .................... | 709/219 |
| 2005/0086071 A1 | * | 4/2005 | Fox et al. .......................... | 705/2 |
| 2005/0192838 A1 | * | 9/2005 | Jones et al. ....................... | 705/2 |
| 2006/0195340 A1 | * | 8/2006 | Smitherman et al. ............. | 705/2 |
| 2008/0046292 A1 | * | 2/2008 | Myers et al. ....................... | 705/3 |
| 2008/0177576 A1 | * | 7/2008 | Jennings et al. .................. | 705/3 |
| 2009/0222539 A1 | * | 9/2009 | Lewis et al. .................... | 709/221 |
| 2010/0299162 A1 | * | 11/2010 | Kwan ............................... | 705/4 |

* cited by examiner

*Primary Examiner* — Djenane Bayard
(74) *Attorney, Agent, or Firm* — Novak Druce Connolly Bove + Quigg LLP

(57) ABSTRACT

A method and system are provided for locally storing data obtained from a plurality of sources, including a remote server, a local server and a client terminal device. A local communication device is provided to include a plurality of applications that access data stored on at least one of the remote server, the local server and the client terminal device and provides access to the data during time periods when the client terminal device is disconnected from at least one of the local server and the remote server. The local communication device includes applications that gather data from the local server, the remote server and the client terminal device and generate a database to store the gathered data. The local communication device includes a conversion module that generates a predefined format for the gathered data prior to storing the data on the database.

21 Claims, 4 Drawing Sheets

SYSTEM AND METHOD OF EMPLOYING A CLIENT SIDE DEVICE TO ACCESS LOCAL AND REMOTE DATA DURING COMMUNICATION DISTRUPTIONS

CROSS-REFERENCE TO RELATED APPLICATION n/a

STATEMENT REGARDING FEDERALLY SPONSORED RESEARCH OR DEVELOPMENT n/a

FIELD OF THE INVENTION

The invention relates to systems and methods of providing centralized client-side data storage and retrieval on a local network. More particularly, the invention relates to systems and methods of converting data having multiple formats to a predefined format and providing centralized client-side data storage and retrieval of the converted data.

BACKGROUND OF THE INVENTION

Client terminals having software applications that access data stored on remote servers are well-known. The client terminals access the Internet or other remote networks to obtain web-based application data that is stored on remote servers. During communication outages, the client terminals are not able to access the remote servers hosting the web-based data. Thus, communication outages may cause client terminal users to experience productivity loss, data loss, or other losses.

Client terminals may include applications that store data on the respective client terminal devices and provide off-line access to the stored data. Known client terminal devices store the data in a format that is defined by the application that generates the data. Known systems require each application to generate and store data in a separate database on the client terminal device. Each separate database is distributed and is accessible only to the application that generated the data. In other words, known systems do not grant data access to other applications running on the client terminal devices that did not generate the data. Various other drawbacks exist with these known systems and with other systems known in the prior art.

SUMMARY OF THE INVENTION

Various aspects of the invention overcome at least some of these and other drawbacks of existing systems. The invention advantageously discloses a method and system for providing a plurality of client terminal devices with connectivity to a central device during off-line operation.

In one embodiment, the invention provides a local communication device that locally stores data obtained from a plurality of sources, including a remote server, a local server and a client terminal device. The remote server is associated with an external network and the local server is associated with an internal network. The client terminal device communicates with the remote server over the external network and communicates with the local server over the internal network. The local communication device includes a software agent that communicates with the local server, the remote server and the client terminal device to gather the data from the local server, the remote server and the client terminal device and provides access to the data during time periods when a data connection is disrupted between the client terminal device and the local server or the remote server. The local communication device further includes a storage module that is adapted to store the gathered data to at least one memory device and a conversion module that generates a predefined format for the gathered data.

In another embodiment of the invention, the invention provides a local communication device that locally stores data obtained from a plurality of sources, including a remote server, a local server and a client terminal device. The remote server is associated with an external network and the local server is associated with an internal network. The client terminal device communicates with the remote server over the external network and communicates with the local server over the internal network. The local communication device includes a software agent that communicates with the local server, the remote server and the client terminal device to gather the data from the local server, the remote server and the client terminal device and provides access to the data during time periods when a data connection is disrupted between the client terminal device and the local server or the remote server. The local communication device further includes a database module that generates and manages at least one database, a storage module that is adapted to store the gathered data to the at least one database, a conversion module that generates a predefined format for the gathered data and a synchronizing module that maintains a data version tag for the data stored in the at least one database.

In yet another embodiment of the invention, a method of facilitating off-line connectivity to a central database is provided. A local communication device stores the data transmitted between selected sources and the client terminal devices and monitors whether the client terminal devices are communicating with the selected sources. When the client terminal devices become decoupled from the selected sources, the local communication device establishes a data connection with the client terminal devices, transmits data to the client terminal devices, and assigns a synchronization start identifier, one or more synchronization intermediate identifiers and a synchronization completed identifier to facilitate data transfer with the selected sources. The local communication device monitors whether a data connection is re-established between the client terminal devices and the selected sources and re-establishes a data connection between the client terminal devices and the selected sources when the client terminal devices are coupled to the selected sources.

Data is transmitted between selected sources and client terminal devices and the data is stored to a local communication device. If a communication channel between the client terminal devices and the selected sources is disrupted, then a data connection is established between the client terminal devices and the local communication device. During the network outage, data is transmitting between the local communication device and the client terminal devices. The local communication device and the selected sources synchronize the stored data to provide the latest retrieved data. The client terminal devices are coupled to the selected sources upon determining that the data connection is re-established between the client terminal devices and the selected sources and any data that is entered during offline operation may be synchronized to the selected data source.

The invention provides numerous advantages over and/or avoids many drawbacks of conventional systems. These and other features and advantages of the invention will be apparent through the detailed description of the embodiments and the drawings attached hereto. It is also understood that both the foregoing general description and the following detailed description are exemplary and not restrictive of the scope of the invention. Numerous other features and advantages of the invention should become apparent upon a reading of the following detailed description when taken in conjunction with the accompanying drawings, a brief description of which is included below.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
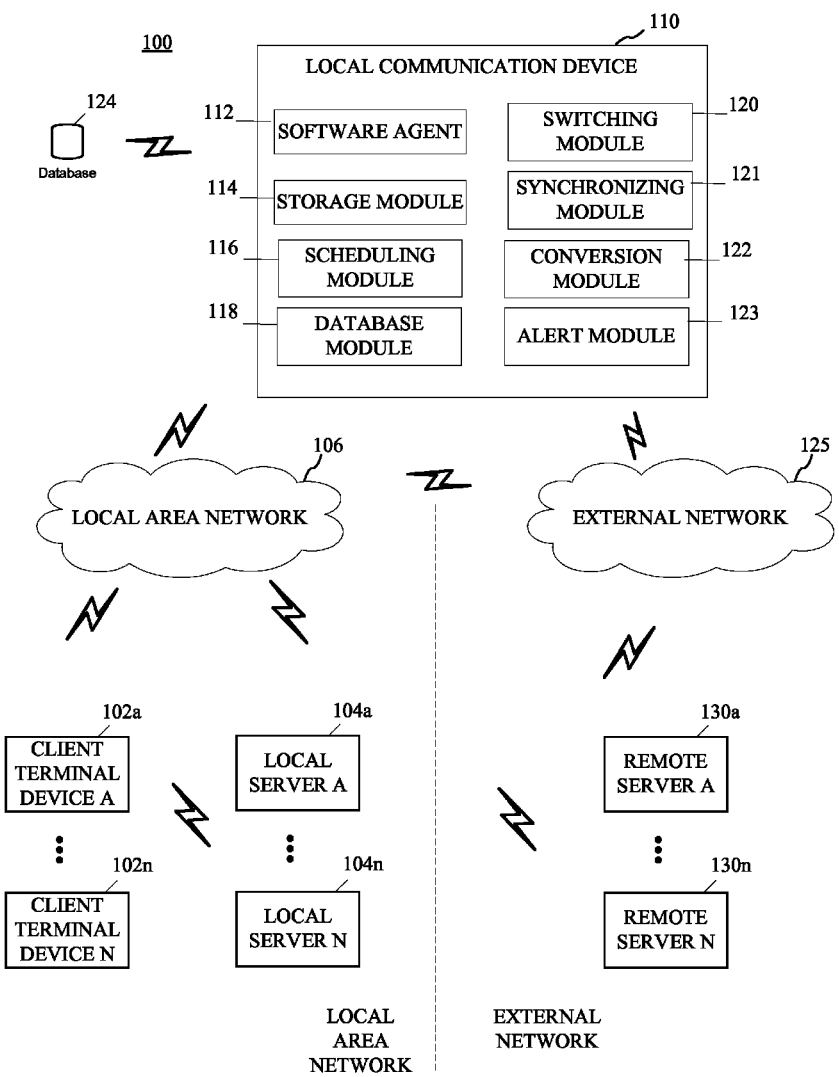
FIG. 1 illustrates a system diagram according to one embodiment of the invention.

The invention provides systems and methods of employing a local communication device that performs centralized client-side data storage and retrieval. The local communication device may be coupled to a plurality of sources, including external networks, internal networks and client terminal devices, among other sources. The local communication device receives data from and transmits data to the plurality of sources and converts the data to preselected formats prior to storage. For example, the local communication device may receive data in any format including MS Word format, MS Excel format, PDF format, or any other format. Prior to storage, the local communication device may convert the received data to preselected formats including Health Level Seven (HL7), Extensible Markup Language (XML), American National Standards Institute (ANSI) standards, viewable format through Medios proprietary application or other preselected formats.

By contrast, known systems employ distributed architectures that include client terminal devices having individual applications that generate distributed databases on the corresponding client terminal device. The distributed databases are stored at the client terminal devices and are accessible only by the individual applications that generate the distributed database. Thus, known systems are deficient at least because the data stored in the distributed database is segmented, non-centralized, non-portable and is available only to the corresponding individual applications.

While specific embodiments of the invention are discussed herein and are illustrated in the drawings appended hereto, the invention encompasses a broader spectrum than the specific subject matter described and illustrated. As would be appreciated by those skilled in the art, the embodiments described herein provide but a few examples of the broad scope of the invention. There is no intention to limit the scope of the invention only to the embodiments described.

Computer networks offer great potential for automating information retrieval and storage. FIG. 1 illustrates an example of the system architecture 100 according to one embodiment of the invention. Client terminal devices 102a-102n (hereinafter identified collectively as 102) may be coupled to one or more local servers 104a-104n (hereinafter identified collectively as 104) and/or to one or more remote servers 130a-130n (hereinafter identified collectively as 130) via a wired network, a wireless network, a combination of the foregoing and/or other networks, such as a local area network 106 and an external network 125. A local communication device 110 may be provided to capture and store data communications between the client terminal devices 102, the local servers 104 and the remote servers 130 and other components.

The local communication device 110 may be of modular construction to facilitate adding, deleting, updating and/or amending modules therein and/or features within modules. Modules may include a software agent 112, a storage module 114, a scheduling module 116, a database module 118, a switching module 120, a synchronizing module 121, a conversion module 122, an alert module 123 or other modules. It should be readily understood that a greater or lesser number of modules might be used. One skilled in the art will readily appreciate that the invention may be implemented using individual modules, a single module that incorporates the features of two or more separately described modules, individual software programs, and/or a single software program.

The software agent 112 may request data from the plurality of sources with or without end user awareness of the data requests. For example, the software agent 112 may capture data exchanges that occur during communications between the client terminal devices 102 and the remote servers 130, wherein the data exchanges are routed through the external network 125, such as the Internet. The software agent 112 may capture the data exchanges in substantially real-time or at predefined intervals. Alternatively, the software agent 112 may trigger capturing the data exchanges based on availability of system resources, such as bandwidth or other system resources. A storage module 114 may be provided to direct the captured data to a desired memory device for storage.

The software agent 112 may include applications that perform the data capture on sources that are coupled to the local communication device 110. The sources may include the client terminal devices 102, the local servers 104, and the remote servers 130, among other sources. For sources that request security credentials (e.g., passwords, digital certificates, etc.) prior to granting access to the data, the software agent 112 may perform authentication prior to requesting the data transfer to the local communication device 110. Alternatively, the software agent 112 may await a user log-in with the security credentials prior to requesting data transfer to the local communication device 110.

If users are not authenticated, then the users may be invited to submit requested information or take other action. If the user is authenticated, then the selected sources may perform other processing. For example, the selected sources may load data or other information (e.g., download) to the client terminal devices 102 that an authorized user may be permitted to access, but has not yet received from the selected sources.

With regard to user authentication, one of several different authentication schemes may be employed, and would be appreciated by those skilled in the art. For example, the user may be asked to input an alphanumeric code. Alternatively, the user may be asked to provide biometric information (i.e., a thumbprint through a fingerprint scanner) or other suitable identifying information. One of ordinary skill in the art will readily recognize that other authentication schemes may be employed.

Figure 2:
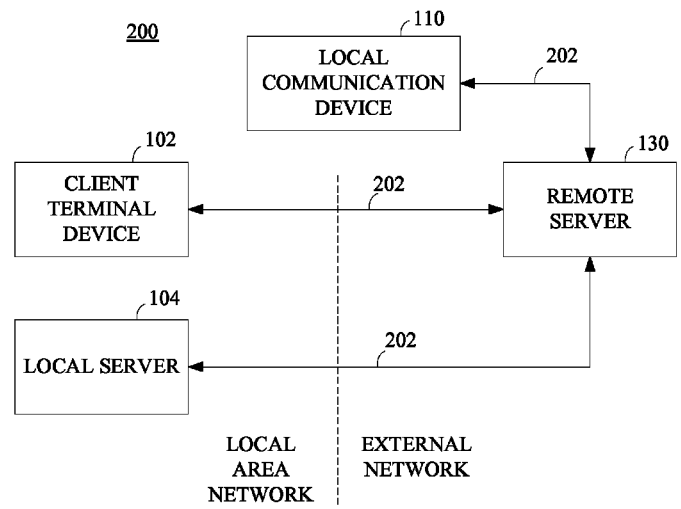
FIG. 2 illustrates an exemplary embodiment of the system of FIG. 1 operating in an environment where external communications paths couple the local devices and the external network devices.

The local communication device 110 may operate as a redundancy device that stores data accessed or data sought to be accessed by the plurality of sources. FIG. 2 illustrates an exemplary embodiment of the system of FIG. 1 operating under conditions where external communication paths 202 couple the remote server 130 to the client terminal devices 102, the local server 104 and/or the local communication devices 110. During operation, the client terminal devices 102 and the local server 104 transmit and receive data from the remote server 130. The local communication device 110 may communicate with the remote server 130 to duplicate and locally store data received from the remote server 130.

Referring to FIG. 1, the software agent 112 may instruct the local communication device 110 to continuously store the requested data. Alternatively, the software agent 112 may instruct the local communication device 110 to update the requested data at predefined schedules or automatically upon availability. A scheduling module 116 may be provided in the local communication device 110 to establish the predefined schedules to include periodic schedules, random schedules, scheduling based on system resources, or other predefined schedules.

The local communication device 110 may include a database module 118 that generates and manages a central database 124. The central database 124 may be accessed by one or more sources, including the client terminal devices 102, the local servers 104 and the remote servers 130. The central database 124 may be structured to mirror the data structure of the selected sources, including the client terminal devices 102, the local servers 104 and the remote servers 130.

According to one embodiment, the local communication device 110 may include a switching module 120 that operates to switch a data connection for the client terminal devices 102 between the selected sources and the central database 124. The operation of switching the data connection for the client terminal devices 102 between the selected sources and the central database 124 may be transparent to users of the client terminal devices 102. Alternatively, the operation of switching data connections for the client terminal devices 102 between the selected sources and the central database 124 may be initiated by users of the client terminal devices.

The switching module 120 may include a feature that determines the communication status of the client terminal devices 102. The feature may detect whether the client terminal devices 102 are operating online or offline, relative to the external network 125. Additionally, the switching module 120 may detect a type of network connection for the client terminal devices 102, such as a wired connection, a wireless connection or other network connection. If the client terminal devices 102 are determined to be operating offline relative to the external network 125, then the client terminal devices 102 may be coupled to the corresponding local communication device 110.

Figure 3:
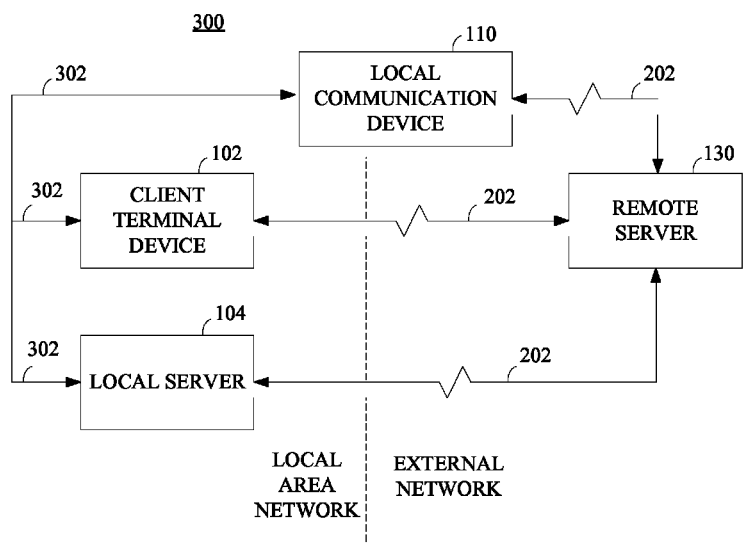
FIG. 3 illustrates an exemplary embodiment of the system of FIG. 1 operating in an environment where external communications paths are decoupled between the local devices and the external network devices and internal communications paths couple the local devices with the local communications device.

FIG. 3 illustrates an exemplary embodiment of the system of FIG. 1 operating in an environment where external communication paths 202 are decoupled between the local devices and the external network devices. Under this condition, internal communication paths 302 are provided to couple the local communications device 110 with the client terminal devices 102 and the local server 104. Since the local communication device 110 locally stores a duplicate of the data stored at the remote server 130, users that are accessing the client terminal devices 102 and the local server 104 do not experience a service disruption when the external communication paths 202 are decoupled.

Regarding transparent switching, the switching module 120 of FIG. 1 may detect trigger events to automatically initiate switching the data connections between the selected sources and the central database 124. The trigger events may include detecting time periods when communication channels to the selected sources are not available, among other trigger events.

Regarding user-initiated switching, the switching module 120 may respond to a manually initiated trigger to switch the data connections between the selected sources and the central database 124. The manually initiated trigger may include enabling users to activate a command at the client terminal devices 102 when communication channels to the selected sources are not available, among other manually initiated triggers.

The local communication device 110 may include a synchronizing module 121 that maintains data version tags for the data stored at the selected sources and the central database 124. The data version tags may be used at the selected sources and the central database 124 to identify the data that is stored most recent in time. According to one embodiment, the synchronizing module 121 may analyze the data version tag and determine whether to replicate data from the selected sources to the central database 124 or from the central database 124 to the selected sources. In this way, the synchronizing module 121 prevents the client terminal devices 102 from accessing expired data. According to one embodiment, the synchronizing module 121 may determine whether the selected sources or the central database 124 is maintaining the most recent data version tag by analyzing which of the selected sources or the central database 124 performed the last save function. Additionally, the remote server 130 may be configured to synchronize a plurality of local communication devices 110 that are spread across multiple networks. The synchronization module 121 may employ a success/fail transaction protocol that ensures data is successfully transferred without any loss of connectivity.

According to one embodiment, the synchronization module 121 may apply a transaction based synchronization algorithm to perform data transfers in predefined stages. The predefined stages may include a start point, breakpoints and a commit point. By performing data transfers using stages, the initial data transfer may be completed even if a data transfer communication is interrupted during transmission. The synchronization module 121 identifies a start point to the beginning of a selected data transfer. After identifying the start point, the synchronization module 121 may assign intermediate breakpoints to the transferred data. The breakpoints are provided to recover data transfer operations if an interruption occurs before the data transfer is complete. For example, after experiencing a data transfer interruption, the data transfer operation may begin from a previously identified successful breakpoint. In other words, the synchronization module 121 enables the data transfer operation to recover from a breakpoint or intermediate transfer point, rather than from the start point or the beginning of the data transfer. When the last breakpoint is successfully traversed, the synchronization module 121 assigns an identification number to the data transfer. Additionally, the synchronization module 121 may classify the data transfer as authentic and complete.

Figure 4:
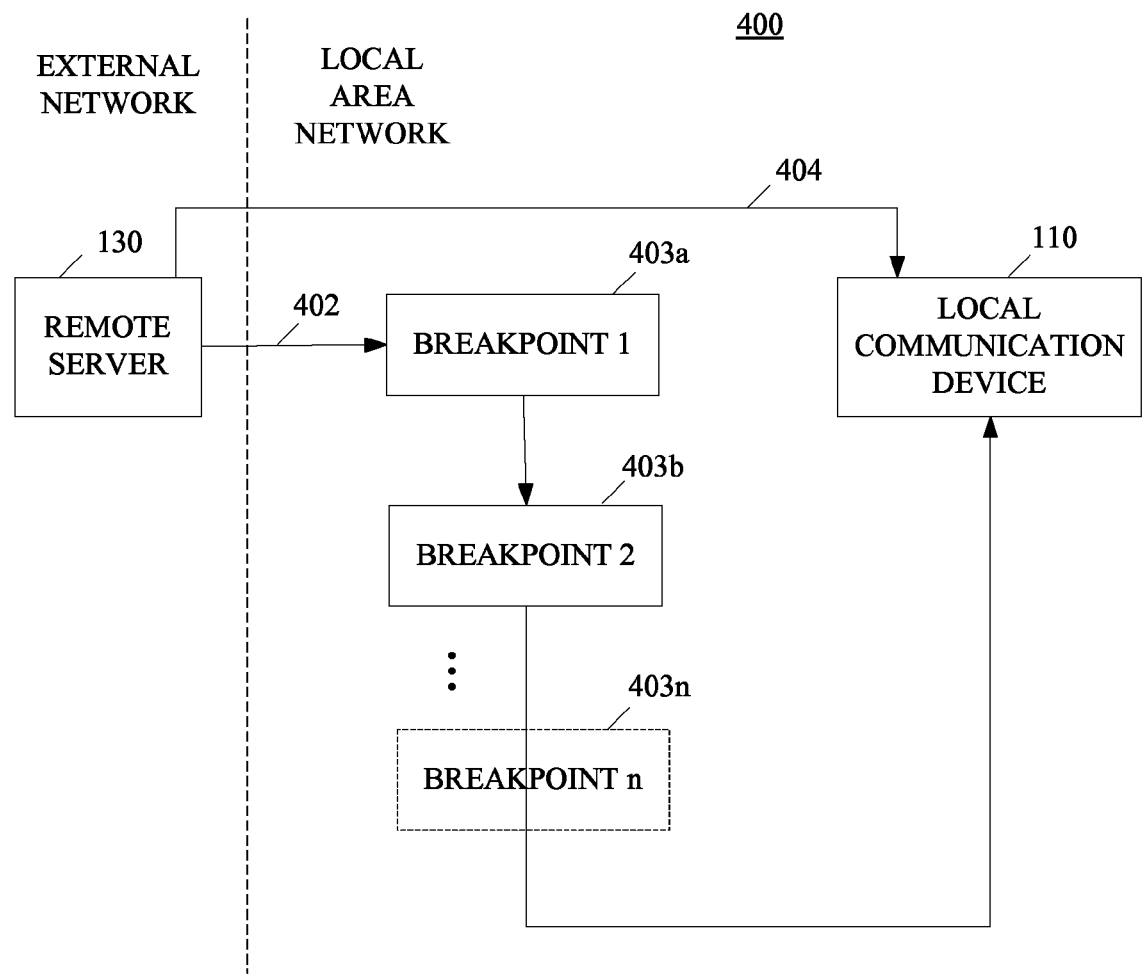
FIG. 4 illustrates a system for transferring data between a remote server and a local communication device according to one embodiment of the invention.

FIG. 4 illustrates a system for performing data transfer. The remote server 130 and the local communication device 110 begin a synchronization process over communication channel 402 using a plurality of intermediate breakpoints or synchronization intermediate identifiers (403a-403n). According to one embodiment, breakpoint 1 (403a) and breakpoint 2 (403b) are established between the remote server 130 and the local communication device 110. During the data transmission, the remote server 130 and the local communication device 110 transmit status information over communication channel 404.

According to one embodiment, the data transmission may occur without experiencing a data transfer interruption. For a synchronization transfer between the remote server 130 and the local communication device 110, the synchronization module 121 may identify a Start Point 1 or start identifier at 01/01/Yr1, 03:00:00 SERVER TIME and data transfer may begin over communication channel 402. The data transfer may traverse BREAKPOINT 1 (403a) at 01/01/Yr1, 03:03:00 SERVER TIME and may traverse BREAKPOINT 2 (403b) at 01/01/Yr1, 03:06:00 SERVER TIME and be successfully completed. Upon success completion, the synchronization module 121 may establish a COMMIT POINT and assign a synchronization complete identification number ID:0001:01/01/Yr1, 03:06:00 SERVER TIME. The data transfer may be considered complete and authenticated upon assignment of identification number ID:0001.

Alternatively, the data transmission may occur with a data transfer interruption. For a synchronization transfer between the remote server 130 and the local communication device 110, the synchronization module 121 may identify a Start Point 1 at 01/01/Yr1, 03:00:00 SERVER TIME and data transfer may begin over communication channel 402. The data transfer may traverse BREAKPOINT 1 (403a) at 01/01/Yr1, 03:03:00 SERVER TIME and may experience an INTERRUPTION at 01/01/Yr1, 03:04:30 SERVER TIME, such as if the server encounters bandwidth loss. The synchronization module 121 may initiate a rollback to BREAKPOINT 1 at 01/01/Yr1, 03:04:35 SERVER TIME. Upon reestablishment of bandwidth at 01/01/Yr1, 03:20:30 SERVER TIME, the synchronization module 121 may begin the data transfer at BREAKPOINT 1 at 01/01/Yr1, 03:20:35 and may traverse BREAKPOINT 2 at 01/01/Yr1, 03:23:35 SERVER TIME and be successfully completed. Upon success completion, the synchronization module 121 may establish a COMMIT POINT, assign identification number ID:0002:01/01/Yr1, 03:23:35 SERVER TIME. The data transfer may be considered completed authenticated upon assignment of identification number ID:0002.

Referring to FIG. 1, the local communication device 110 may include a conversion module 122 that converts the received data to preselected formats including Health Level Seven (HL7), Extensible Markup Language (XML), American National Standards Institute (ANSI) standards, or other preselected formats prior to storage. Other standards that enable interoperability may be employed, such as but not limited to CCD, DICOM, HIPAA, and HITSP.

The data that is stored in the central database 124 may be searched using a variety of techniques. According to one embodiment, the search may be performed using a structured query language (SQL) that uses SQL statements to perform tasks on the database 124, such as retrieving data from the database 124.

The local communication device 110 may include an alert module 123 that generates notifications and/or alerts in real-time. The generated notifications and/or alerts may be delivered in real-time to notify users of the status of the network connectivity.

The client terminal devices 102 may include any number of different types of client terminal devices, such as medical devices, medical equipment, personal computers, laptops, smart terminals, personal digital assistants (PDAs), mobile devices, cell phones, Web TV systems, video game consoles, and devices that combine the functionality of one or more of the foregoing or other client terminal devices. The client terminal devices 102 may include processors, RAM, USB interfaces, telephone interfaces, satellite interface, microphones, speakers, a stylus, a computer mouse, a wide area network interface, a local area network interface, hard disks, wireless communication interfaces, DVD/CD reader/burners, a keyboard, a flat touch-screen display, and a display, among other components.

According to one embodiment, the client terminal devices 102 may include a touch-sensitive display screen, a handset, speakers and input buttons, among other features. Select functions may be implemented on the client terminal devices 102 by positioning an indicator over selected icons and manipulating an input receiving device such as a touch-sensitive display screen, a mouse, a keyboard, a voice recognition system or other input receiving devices. The client terminal devices 102 may include a video input device to permit audio-visual communication with other client terminal devices 102, such as to permit dictation by medical personnel. The client terminal devices 102 may communicate with the remote servers 130, the local servers 104, other client terminal devices 102 and/or other systems.

Users may access the client terminal devices 102 to communicate with the selected sources, including the client terminal devices 102, the local servers 104 and the remote servers 130. Data requests that originate from the client terminal devices 102 may be broadcast to selected sources and the local communication device 110 in substantially in real-time if the client terminal devices 102 are coupled to networks 106,125. Alternatively, communications from the client terminal devices 102 may be delayed for an amount of time if, for example, a selected client terminal device 102 is not connected to the local area network 106. For example, the data connection between the client terminal device 102 and the local server 104 or the remove server 130 may be disrupted due to a large latency, a delayed connection, or a severed connection, among other disruptions.

According to one embodiment of the invention, any requests that are made while the client terminal devices 102 are not connected to the local area network 106 may be stored and propagated from/to the offline client terminal device 102 when the selected sources, the local communication device 110 and the target client terminal device 102 are re-connected to networks 106/125. For example, if the target client terminal device 102 is not connected to network 106, then requests remain in the corresponding client terminal device 102 for dissemination to the local communication device 110 or the selected sources when the target client terminal devices 102 are re-connected to networks 106/125.

Figure 5:
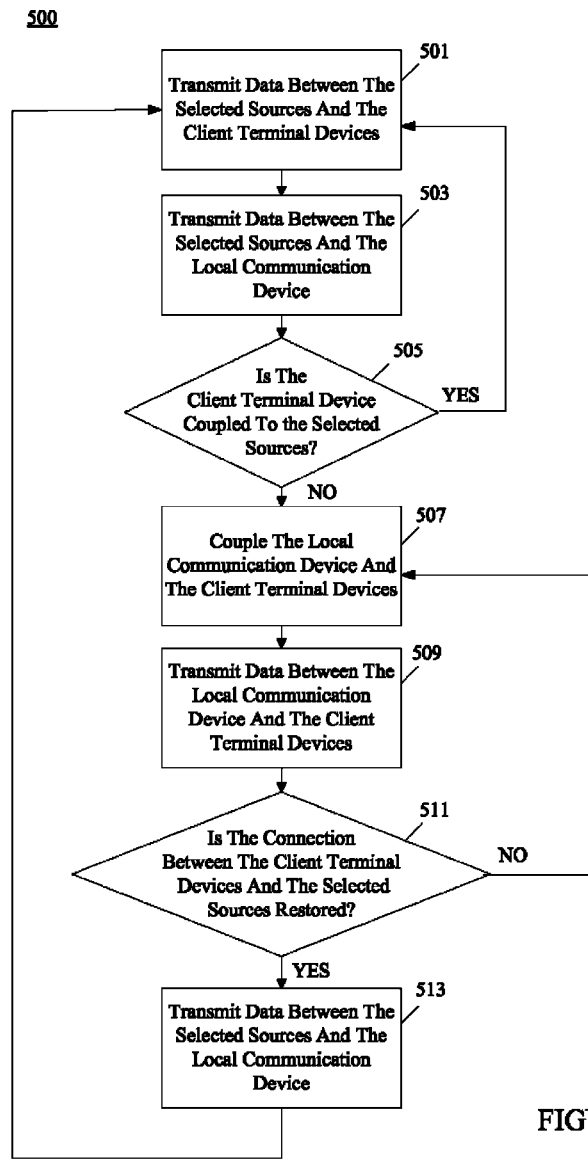
FIG. 5 illustrates a flow chart for providing a plurality of client terminal devices with off-line connectivity to a central database.

FIG. 5 illustrates a method 500 of providing a plurality of client terminal devices with off-line connectivity to a central database. Data is transmitted between the selected sources and the client terminal device 102 in operation 501, wherein data communication is performed via networks 106/125. For example, the network 125 may include the Internet. Data communication between the client terminal devices 120 and the selected sources may occur substantially in real-time if the client terminal devices 102 are connected to the networks 106/125. In operation 503, data is transmitted between the selected sources and the local communication device 110, wherein the data communication is performed via network 106/125. One of ordinary skill in the art will appreciate that communications may be conducted in various ways and among various devices.

A determination is made in operation 505 whether the client terminal devices 102 remain in communication with the selected sources. If the client terminal device 102 and the selected sources remain in communication, then the system returns to operation 501. If the client terminal device 102 and the selected sources are no longer in communication, then the client terminal device 102 is coupled to the local communication device 110 in operation 507. In operation 509, data is transmitted between the client terminal devices 102 and the local communication device 110, wherein the data communication is performed via network 106. One of ordinary skill in the art will appreciate that communications may be conducted in various ways and among various devices.

A determination is made in operation 511 whether the connection between the client terminal devices 102 and the selected sources is restored. If the connection between the client terminal device 102 and the selected sources is not restored, then the system returns to operation 507. If the connection between the client terminal device 102 and the selected sources is restored, then the system synchronizes data between the local communication device and the selected sources in operation 513 and the system returns to operation 501.

The invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A local communication device that locally stores data obtained from a plurality of sources, the local communication device being in communication with a local server that is associated with a local network, the local server also associated with an external network, and at least one client terminal device that communicates with the local server over an internal network, the local server synchronizing with a remote server over the external network, the local communication device comprising:

a software agent that communicates with the local server, the remote server and the at least one client terminal device to gather the data from the local server, the remote server and the at least one client terminal device, wherein the local communication device provides access to the data independent of time periods when a data connection is disrupted between the at least one client terminal device and at least one of the local server and the remote server;

a database module that generates and manages at least one database;

a storage module that is adapted to store the gathered data to at least one memory device;

a conversion module that generates a predefined format for the gathered data; and a synchronizing module that applies a transaction-based synchronization algorithm to transfer data at predefined stages between at least two of the local server, the remote server and the at least one client terminal device, wherein the synchronization module assigns a synchronization start identifier, one or more synchronization intermediate breakpoints and a synchronization completed identifier to facilitate data transfer between the at least one database with a second database associated with at least one of the local server and the remote server.

2. The local communication device according to claim 1, further comprising a scheduling module that provides predefined schedules for storing the gathered data to the at least one memory device.

3. The local communication device according to claim 2, wherein the scheduling module stores the gathered data based at least on one of periodic intervals, random intervals and system triggered intervals.

4. The local communication device according to claim 1, further comprising a switching module that switches a data connection between the local server, the remote server and the at least one client terminal device.

5. The local communication device according to claim 4, wherein the switching module automatically switches the data connection between the local server, the remote server and the at least one client terminal device.

6. The local communication device according to claim 4, wherein the switching module provides manual switching of the data connection between the local server, the remote server and the at least one client terminal device.

7. The local communication device according to claim 1, wherein the conversion module generates the predefined format to include at least one of American National Standards Institute (ANSI) standards, extensible markup language (XML), Health Level Seven (HL 7) standard and universal data format.

8. The local communication device of claim 1, further comprising a scheduling module that provides threshold triggered schedules for storing the gathered data to the at least one memory device.

9. The local communication device of claim 1, the synchronization algorithm further comprising transferring data between at least two of the local server, the remote server and the at least one client terminal device at identified thresholds.

10. A local communication device that locally stores data obtained from a plurality of sources, the local communication device being in communication with a local server that is associated with a local network, the local server also associated with an external network, and at least one client terminal device that communicates with the local server over an internal network, the local server synchronizing with a remote server over the external network, the local communication device comprising:
- a software agent that communicates with the local server, the remote server and the at least one client terminal device to gather the data from the local server, the remote server and the at least one client terminal device, wherein the local communication device provides access to the data independent of time periods when a data connection is disrupted between the at least one client terminal device and at least one of the local server and the remote server;
- a database module that generates and manages at least one database;
- a storage module that is adapted to store the gathered data to the at least one database;
- a conversion module that generates a predefined format for the gathered data; and
- a synchronizing module that applies a transaction-based synchronization algorithm to transfer data stored in the at least one database at predefined stages, wherein the synchronization module assigns a synchronization start identifier, one or more synchronization intermediate breakpoints and a synchronization completed identifier to facilitate data transfer between the at least one database with a second database associated with at least one of the local server and the remote server.

11. The local communication device according to claim 10, further comprising a scheduling module that provides predefined schedules for storing the gathered data to the at least one database.

12. The local communication device according to claim 11, wherein the scheduling module stores the gathered data based at least on one of periodic intervals, random intervals and system triggered intervals.

13. The local communication device according to claim 10, further comprising a switching module that switches a data connection between the local server, the remote server and the at least one client terminal device.

14. The local communication device according to claim 13, wherein the switching module automatically switches the data connection between the local server, the remote server and the at least one client terminal device.

15. The local communication device according to claim 13, wherein the switching module provides manual switching of the data connection between the local server, the remote server and the at least one client terminal device.

16. The local communication device according to claim 10, wherein the conversion module generates the predefined format to include at least one of American National Standards Institute (ANSI) standards, extensible markup language (XML), Health Level Seven (HL7) standard and universal data format.

17. A method of providing client terminal devices with off-line connectivity to a central database, the method comprising:
- storing data transmitted between selected sources and the client terminal devices;
- monitoring whether the client terminal devices are communicating with the selected sources;
- establishing a data connection with the client terminal devices when the client terminal devices become decoupled from the selected sources;
- transmitting data to the client terminal devices;
- assigning a synchronization start identifier, one or more synchronization intermediate breakpoints and a synchronization completed identifier to facilitate data transfer with the selected sources at predefined stages;
- monitoring whether a data connection is re-established between the client terminal devices and the selected sources; and
- re-establishing a data connection between the client terminal devices and the selected sources when the client terminal devices become coupled to the selected sources.

18. The method according to claim 17, further comprising providing predefined schedules for storing the data that is transmitted between the selected sources and the client terminal devices.

19. The method according to claim 18, wherein providing predefined schedules includes storing the data based at least on one of periodic intervals, random intervals and system triggered intervals.

20. The method according to claim 17, wherein re-establishing a data connection between the client terminal devices and the selected sources is performed automatically.

21. The method according to claim 17, further comprising classifying the data transfer as authentic and complete.

* * * * *